United States Patent
Beaulieu et al.

(10) Patent No.: US 12,519,614 B1
(45) Date of Patent: Jan. 6, 2026

(54) OPTICAL FEISTEL ENCRYPTION AND DECRYPTION CIRCUITS

(71) Applicant: The Government of the United States as represented by the Director, National Security Agency, Ft. George G. Meade, MD (US)

(72) Inventors: Raymond Beaulieu, San Diego, CA (US); Elliot M. Findley, Sterling, VA (US); Scott R McNown, Laurel, MD (US); Harris Turk, Baltimore City, MD (US)

(73) Assignee: The Government of the United States as represented by the Director, National Security Agency, Ft. George G. Meade, MD (US)

(*) Notice: Subject to any disclaimer, the term of this patent is extended or adjusted under 35 U.S.C. 154(b) by 163 days.

(21) Appl. No.: 18/428,424

(22) Filed: Jan. 31, 2024

(51) Int. Cl.
*H04L 29/00* (2006.01)
*H04L 9/00* (2022.01)
*H04L 9/06* (2006.01)

(52) U.S. Cl.
CPC .......... *H04L 9/0625* (2013.01); *H04L 9/003* (2013.01); *H04L 2209/12* (2013.01); *H04L 2209/24* (2013.01)

(58) Field of Classification Search
CPC ............... H04L 9/0625; H04L 9/003; H04L 2209/12; H04L 2209/24
USPC ........................................................ 380/28
See application file for complete search history.

(56) References Cited

U.S. PATENT DOCUMENTS

| | | | |
|---|---|---|---|
| 5,329,294 | A | 7/1994 | Ontawar et al. |
| 5,940,514 | A | 8/1999 | Heanue et al. |
| 6,744,991 | B1 | 6/2004 | Cao |
| 6,952,172 | B1 | 10/2005 | Bhardwaj et al. |
| 7,457,548 | B2 | 11/2008 | Tomaru |
| 7,656,931 | B2 | 2/2010 | Smith et al. |
| 7,822,342 | B1 | 10/2010 | Roberts et al. |
| 8,532,498 | B2 | 9/2013 | Shpantzer |

(Continued)

OTHER PUBLICATIONS

Kraft, C., Using the Modulo Inverse Prefilter as a Data Scrambling Device, Mil Comm Conf, MILCOM 88, 1988, pp. 39-43 vol. 1, IEEE.

Price, C.H. et al., All-Optical Encryption for 10 Gbps and Above Links, Optical Society of America/National Fiber Optic Engineers Conference 2005 Technical Digest, Optica Publishing Group 2005, paper thL4.

(Continued)

*Primary Examiner* — Jeffrey C Pwu
*Assistant Examiner* — Michael D Anderson

(57) ABSTRACT

A Feistel encrypter receives optical input signals to be encrypted and outputs encrypted optical output signals. The Feistel encrypter may include any number of stages to achieve a desired level of encryption. Each stage provides two half stages, each including a splitter, a converter, and a phase modulator. The converter converts an optical Feistel input signal into an electrical signal. The phase modulator modulates an optical Feistel input signal based upon the electrical signal to provide a phase modulated signal. First and second phase modulated signals of the first stage are provided to the second and first inputs, respectively, of the next Feistel stage (if any). As the signals undergo transformation at each Feistel stage, the sample-and-hold with proper alignment allows the bandwidth of first and second phase modulated signals to be maintained. Encryption of the signals continues with each subsequent Feistel stage until the final Feistel encryption stage is completed and an encrypted data signal is provided.

22 Claims, 11 Drawing Sheets

(56) References Cited

U.S. PATENT DOCUMENTS

| | | |
|---|---|---|
| 8,558,905 B2 | 10/2013 | Ootsu et al. |
| 8,699,888 B2 | 4/2014 | Scaffardi et al. |
| 9,749,060 B1 | 8/2017 | Wang et al. |
| 2003/0175034 A1 | 9/2003 | Noe |
| 2004/0131011 A1 | 7/2004 | Sandell et al. |
| 2005/0031016 A1 | 2/2005 | Rosen |
| 2005/0041752 A1 | 2/2005 | Rosen |
| 2005/0219066 A1 | 10/2005 | Bhardwaj et al. |
| 2006/0153573 A1 | 7/2006 | Tomaru |
| 2007/0088997 A1 | 4/2007 | Lablans |
| 2007/0264012 A1 | 11/2007 | Healey et al. |
| 2008/0175597 A1 | 7/2008 | Arahira |
| 2009/0041243 A1 | 2/2009 | Nambu |
| 2011/0170690 A1 | 7/2011 | Shpantzer |
| 2011/0249129 A1 | 10/2011 | Ootsu et al. |
| 2012/0219290 A1 | 8/2012 | Scaffardi et al. |
| 2012/0327957 A1 | 12/2012 | Oxenlowe et al. |

OTHER PUBLICATIONS

Xu et al., Postnonlinearity Compensation with Data-Driven Phase Modulators in Phase-Shift Keying Transmission, Optics Letters, Sep. 15, 2002, vol. 27, No. 18, Optical Society of America.

Liu, Shi, Changliang Guo, and John T. Sheridan. "A review of optical image encryption techniques." Optics & Laser Technology 57 (2014): 327-342.

Lin, Chaco, Xueju Shen and Baochen Li. "Four-dimensional key design in amplitude, phase, polarization and distance for optical encryption based on polarization digital holography and QR code." Optics Express 22.17 (2014): 20727-20739.

Mogensen, Paul C., Rene L. Eriksen, and Jesper Gluckstad. "High capacity optical encryption system using ferro-electric spatial light modulators." Journal of Optics A: Pure and Applied Optics 3.1 (2001):10.

Mitchell, Arnan, et al. "Ultra-broadband shortwave polarization modulators for high-speed free-space quantum cryptography." Quantum Communications and Quantum Imaging. vol. 5161. International Society for Optics and Photonics, 2004.

OPTICAL FEISTEL ENCRYPTION AND DECRYPTION CIRCUITS

FIELD OF THE INVENTION

This invention is generally directed to optical Feistel encryption and decryption circuits.

BACKGROUND OF THE INVENTION

Currently secure transmission of data signals requires digital encryption at the logical (bit) layer. A trunk encrypter on a high speed fiber optic link therefore, must first coherently detect the signal; convert the analog detected signal into a digital stream; compensate for fiber dispersion and signal impairments; recover the data clock; demultiplex the data; encrypt the data at the logical level and then repackage and re-modulate the data. For modern and future fiber optic links, these laborious processes require power hungry devices such as field programmable gate arrays (FPGA) or expensive application specific integrated circuits (ASIC). The advent of new multiphase modulation methods has greatly increased bit rates, resulting in a multiplication of the size, weight and power (SWAP) of the electronics needed by encryption devices. Furthermore, with each new advance in modulation method, or change of data format, new trunk encrypters must be developed and deployed at high cost.

Thus a need exists to cost effectively increase the security of extremely high data rate fiber optic signals in a way that avoids early obsolescence. One approach to securing optical signals is to encrypt/scramble them in the physical domain with a combination of linear and non linear encryption/scrambling elements. These encryption elements operate on light at the physical layer by modifying the amplitude, phase, polarization, etc. of the light in ways that obscure the information carried from an eavesdropper. Currently though, the nonlinear transformations must be reversible in order for the intended receiver to decrypt the signal. This restriction of reversibility greatly reduces the design space available to developers of secure optical physical layer encrypters.

SUMMARY OF THE INVENTION

Briefly, the present invention discloses an optical Feistel encryption circuit including a Feistel encrypter and a corresponding Feistel decryption circuit including a corresponding Feistel decrypter. The Feistel encrypter receives optical input signals to be encrypted and outputs encrypted optical output signals. The Feistel encrypter may include any number of stages to achieve a desired level of encryption. Each stage of the Feistel encrypter provides two half stages. Each half stage includes a splitter, a converter, and a phase modulator. The splitter splits a first optical Feistel input signal to provide the first optical Feistel input signal to the converter of the first half stage and to the phase modulator of the second half stage. The converter converts the first optical Feistel input signal into a first electrical signal. The phase modulator receives the first electrical signal and modulates the second optical Feistel input signal based upon the first electrical signal to provide a first phase modulated signal. The splitter of the second half stage provides the first phase modulated signal to the converter of the second half stage and to the output of the encrypter stage. The converter of the second half stage converts the first phase modulated signal to a second electrical signal. The phase modulator of the second half stage receives the first optical Feistel input signal and modulates the first optical Feistel input signal based on the second electrical signal to provide a second phase modulated signal to the output of the encrypter stage. The first and second phase modulated signals of the first stage are provided to the second and first inputs, respectively, of the next Feistel stage (if any). As the signals undergo transformation at each Feistel stage, the sample-and-hold with proper alignment allows the bandwidth of first and second phase modulated signals to be maintained. Encryption of the signals continues with each subsequent Feistel stage until the final Feistel encryption stage is completed and an encrypted data signal is provided.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 1:
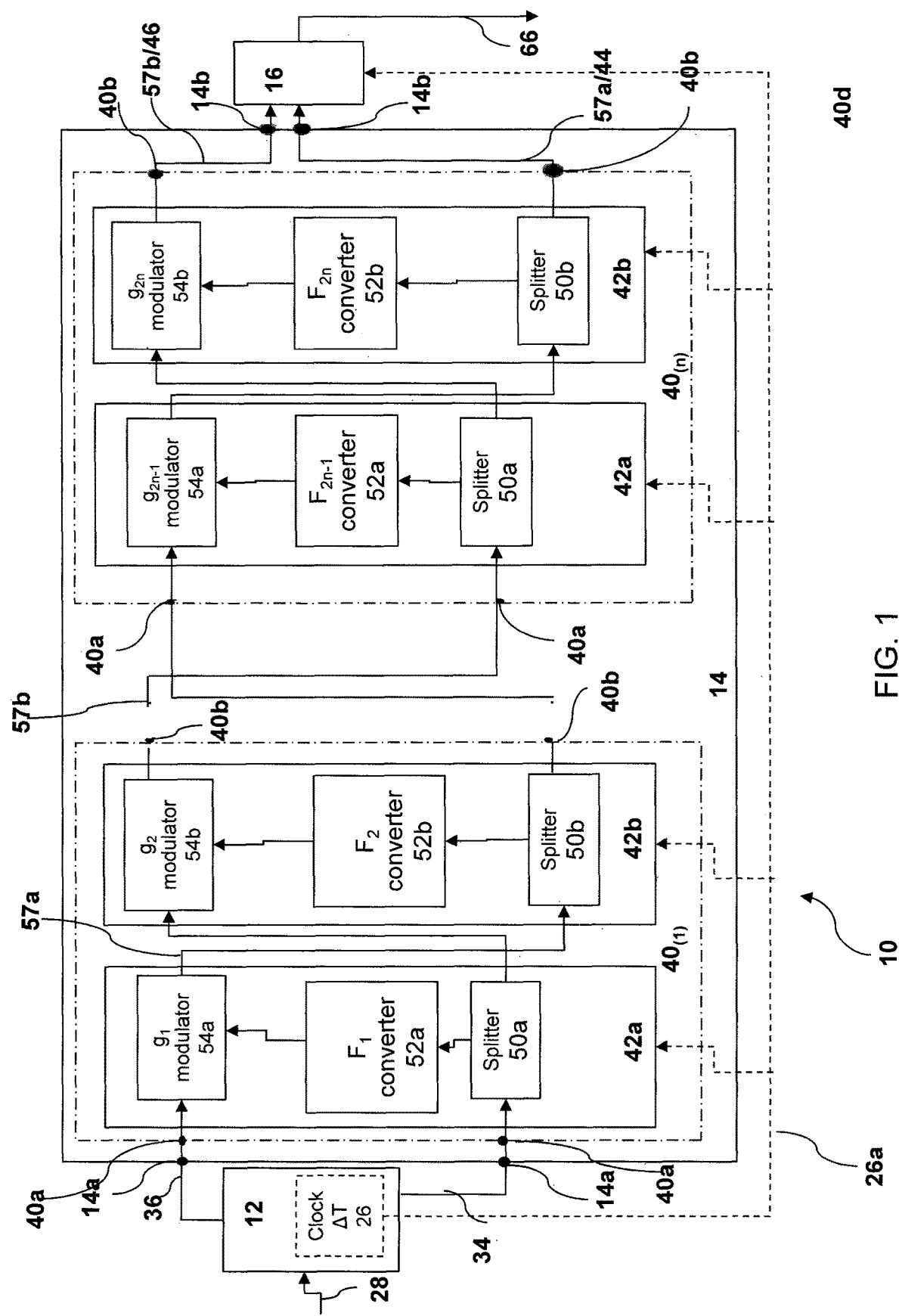
FIG. 1 illustrates an optical Feistel encryption circuit of the present invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

An embodiment of an optical Feistel encryption circuit of the present invention is illustrated in FIG. 1. As illustrated in FIG. 1, the optical encryption circuit 10 generally includes an input processing circuit 12, a Feistel encrypter 14, and an output processing circuit 16.

Figure 2A:
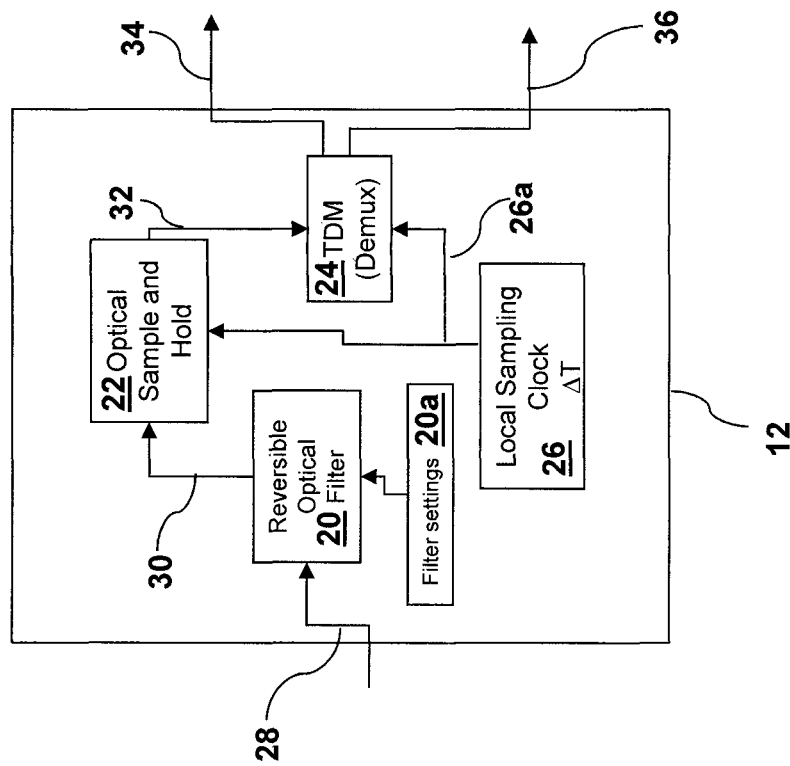
FIG. 2a illustrates an embodiment of the input processing circuit of the optical Feistel encryption circuit of FIG. 1.
Figure 2B:
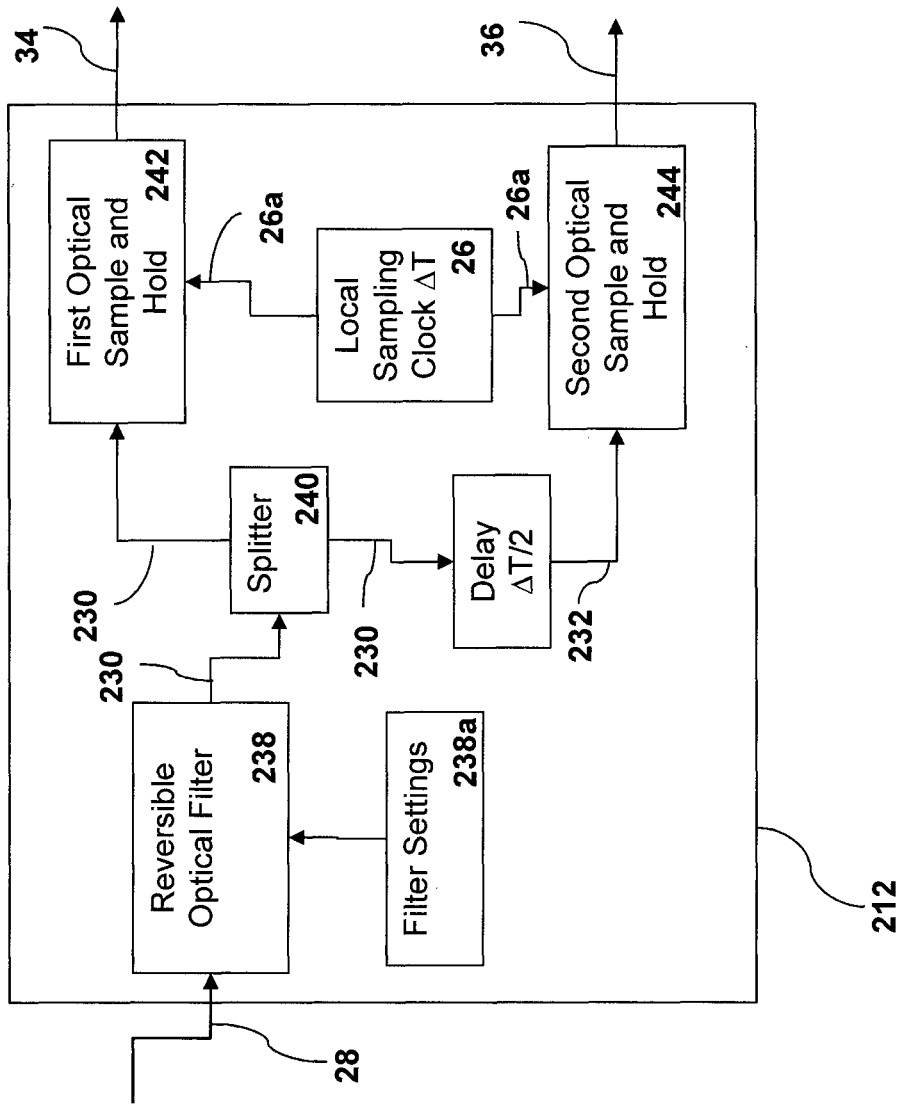
FIG. 2b illustrates an alternative embodiment of the input processing circuit of the optical Feistel encryption circuit of FIG. 1.

The input processing circuit 12 receives an optical data signal 28 to be encrypted and includes a local sampling clock 26 providing a clock signal 26a. The input processing circuit 12 further provides a pair of optical Feistel input signals, including first and second optical Feistel input signals 34, 36 to the Feistel encrypter 14. Additional details of the input processing circuit 12 are illustrated in FIGS. 2a and 2b.

As illustrated in FIG. 1, the Feistel encrypter 14 generally incudes a pair of encrypter inputs 14a, a pair of encrypter outputs 14b, and a series of Feistel stages $40_{(1)}$-$40_{(n)}$. The Feistel encrypter 14 includes as many Feistel stages 40 as required to achieve a desired level of security. Each Feistel stage $40_{(n)}$ includes a pair of stage inputs 40a and a pair of stage outputs 40b. The stage inputs 40a of initial Feistel stage $40_{(1)}$ provide the Feistel encrypter inputs 14a of the Feistel encrypter 14. The stage inputs 40a of the initial Feistel stage $40_{(1)}$ receive the first and second optical Feistel input signals 34, 36 provided by the input processing circuit 12. The stage outputs 40b of the final Feistel stage $40_{(n)}$ provide the Feistel encrypter outputs 14b of the Feistel encrypter 14. The first and second optical Feistel output signals 44, 46 are provided at the stage outputs 40b of the final Feistel stage $40_{(n)}$ and to the output processing circuit 16.

Each Feistel stage 40 includes a pair of half stages 42a, 42b. For example, initial Feistel stage $40_{(1)}$ includes half stages 42a and 42b and final Feistel stage $40_{(n)}$ also includes half stages 42a and 42b. Thus, the number of Feistel half stages is represented by 2n. Each half stage 42a includes a splitter 50a, a converter 52a, and a modulator 54a. Each half stage 42b includes a splitter 50b, a converter 52b, and a modulator 54b. The function applied to the signals processed by the converters 52 is denoted "F" and the function applied to the signals processed by the modulators 54 is denoted "g". Half stage 42a of the initial encrypter stage $40_{(1)}$ receives the first and second optical Feistel input signals 34, 36 and provides first phase modulated signal 57a and half stage 42b provides second phase modulated signal 57b. Each Feistel half stage further transforms the signals in accordance with functions F and g, thereby adding a layer of security. Functions F and g of one Feistel stage may be the same as functions F and g of another half stage, but need not be. Additional details of the half stages 42a, 42b of Feistel encrypter 14 are provided below in connection with FIG. 4.

The output processing circuit 16 receives first and second optical Feistel output signals 44, 46 of the Feistel encrypter 14 and provides an encrypted data signal 66. Details of the output processing circuit 16 are provided below in connection with FIG. 3.

Details of exemplary embodiments of the input processing circuit 12 are illustrated in FIGS. 2a and 2b. As illustrated in FIG. 2a, the input processing circuit generally includes a reversible optical filter 20, an optical sample and hold circuit 22, a time division demultiplexer (DeMux) 24 and a local sampling clock 26, providing a local sampling clock signal 26a at a rate of $1/\Delta T$, where the rate $1/\Delta T$ satisfies Nyquist's criteria.

The reversible optical filter 20 receives the optical data signal 28 to be encrypted. Optical filter settings 20a are provided to the reversible optical filter 20. The reversible optical filter 20 filters the incoming signal 28 based upon the filter settings 20a and provides a filtered optical input signal 30. The reversible optical filter 20 may be, for example, the programmable optical filter described by F. Froehlich, et al., "All-optical encryption for links at 10 Gbps and above", MILCOM 2005, pp. 2158-2164, October 2005.

The optical sample and hold circuit 22 receives the filtered optical input signal 30 and a local sampling clock signal 26a provided by the local sampling clock 26. The optical sample and hold circuit 22 samples/measures the filtered optical input signal 30 at the onset of sample clock pulse 26a. The optical sample and hold circuit 22 generates a sampled and held optical signal 32 having the same complex amplitude as the measured filtered optical input signal 30 and holds that value until the next sample clock pulse 26a. For example, a coherent receiver generates I and Q components of the optical signal 30 as electrical signals. These I and Q components are provided to electrical sample and hold circuits which each provide electrical outputs which are in turn provided to an optical I-Q modulator. The optical I-Q modulator generates an optical sampled and held signal 32.

The demultiplexer 24 receives the sampled and held optical signal 32 and the local sampling clock signal 26a. The demultiplexer 24 splits the sampled and held optical signal 32 into two physically separate sampled optical signals to provide first and second Feistel input signals 34, 36. The first and second optical Feistel input signals 34, 36 typically represent alternating samples of the input data signal 28. Feistel input signals 34, 36 are a representation of the sampled signal and contain all of the information in the signal 28.

FIG. 2b illustrates an alternative input processing circuit 212 for use in connection with the Feistel encryption circuit 10. The input processing circuit 212 generates first and second Feistel input signals 34, 36. The input signal processing circuit 212 includes a reversible linear optical filter 238, an optical splitter 240, and first and second optical sample and hold circuits 242, 244. Filter settings 238a are provided to program the reversible linear optical filter 238. The reversible linear optical filter 238 receives the incoming optical data signal 28 and filters the signal 28 to provide a filtered signal 230. The reversible optical filter 238 may be, for example, a programmable filter as described above.

Splitter 240 receives the filtered signal 230 and provides that filtered signal 230 to the first optical sample and hold circuit 242. Filtered signal 230 is also delayed one-half of a clock cycle and the delayed signal 232 is provided to a second optical sample and hold circuit 244. Local sampling clock 26 provides a sample clock signal 26a to the sample and hold circuits 242, 244 at intervals of $\Delta T$. Each optical sample and hold circuit 242, 244 measures the respective filtered signal 230a, 232 at the onset of a sample clock pulse 26a and generates an optical sampled and held signal that has the same complex amplitude as the signal received by the sample and hold circuit 242, 244, and holds the complex amplitude until the next sample clock pulse. An output of the first optical sample and hold circuit 242 provides the first Feistel input signal 34 and the output of the second optical sample and hold circuit 244 provides the second Feistel input signal 36. Because the input processing circuit 212 provides two samples with each clock pulse, the clock 26 of the input processing circuit 212 of FIG. 2b may run at half the rate as the clock 26 of the input processing circuit 12 of FIG. 2a. As a result, the Nyquist criteria for the clock of FIG. 2b may be satisfied with a clock 26 that runs at half the speed as the clock 26 of FIG. 2a. Because lower clock speeds typically translate to lower cost components, the input processing circuit 212 of FIG. 2b may provide cost savings relative to the input processing circuit 12 of FIG. 2a despite the additional components.

Figure 3:
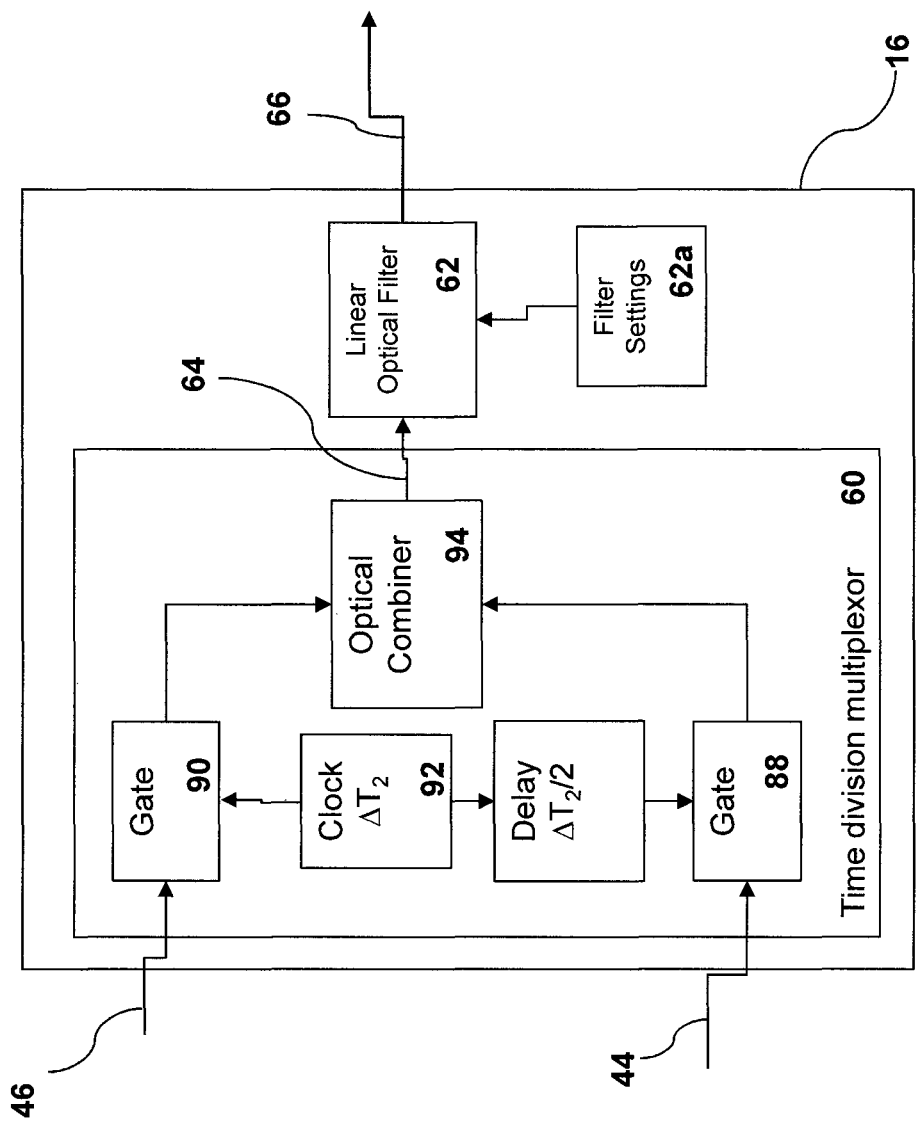
FIG. 3 illustrates the output processing circuit of the optical Feistel encryption circuit of FIG. 1 shown in greater detail.

Details of the output processing circuit are illustrated in FIG. 3. The output processing circuit 16 generally incudes a time division multiplexer (Mux) 60 and a linear optical filter 62. The Mux 60 receives the first and second optical Feistel output signals 44, 46, multiplexes the first and second optical Feistel output signals 44, 46 to provide a multiplexed Feistel encrypted signal 64. More specifically, the MUX 60 includes first and second gates 88, 90, a MUX clock 92 and an optical combiner 94. The first gate 88 receives first Feistel output signal 44 and the second gate 90 receives second Feistel output signal 46. Clock 92 provides a clock signal at time intervals, $\Delta T_2/2$. Clock 92 of FIG. 3 and clock 26 of FIG. 1 may be provided by a single clock. The Feistel output signal 46 at second gate 90 is sampled at each clock interval. A delay of $\Delta T_2/2$ is provided to the clock signal for sampling of the Feistel output signal 44 at first gate 88. The sampled Feistel output signals are combined at optical combiner 94 to provide the single multiplexed Feistel encrypted signal 64. Filter settings 62a are applied to the linear optical filter 62. The linear optical filter 62 receives the multiplexed Feistel encrypted signal 64 and provides an optical Feistel encrypted output signal 66. Although the output signal processing circuit 16 multiplexes the Feistel output signals 44 and 46, multiplexing of the Feistel output signals is not required.

Figure 4:
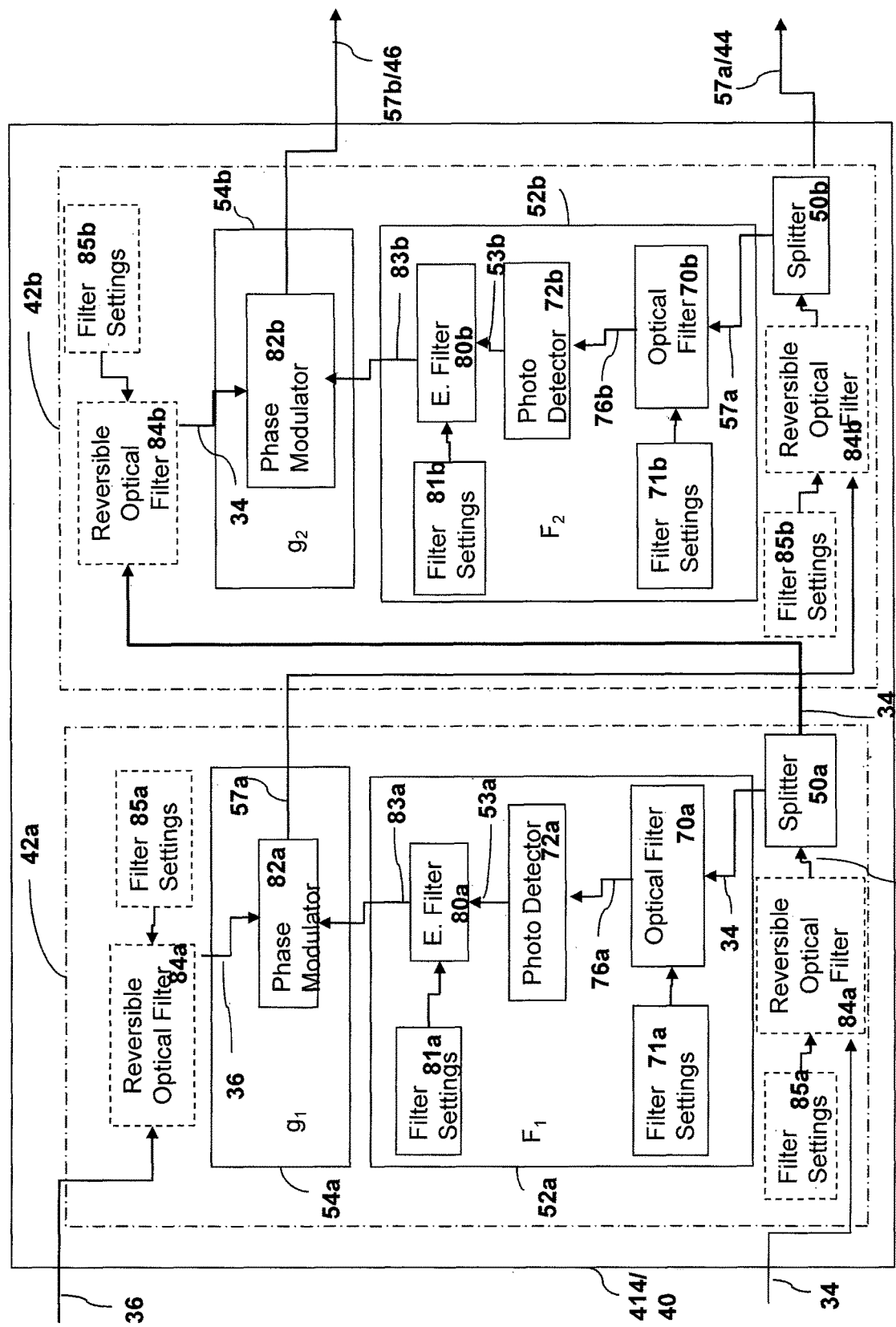
FIG. 4 illustrates a single stage Feistel encrypter of the present invention for use in the optical Feistel encryption circuit of FIG. 1.

As illustrated in FIG. 1, the optical signal encryption circuit 10 includes a Feistel encrypter 14 that may have multiple Feistel stages 40 to provide the desired level of encryption. FIG. 4 illustrates a single stage Feistel encrypter 414 illustrated in greater detail. The Feistel encrypter 414 includes a single Feistel stage 40 having first and second half stages 42a and 42b. Each half stage 42a, 42b includes a splitter 50, a converter 52, and a modulator 54. Feistel stage 40 receives first and second Feistel input signals 34, 36 and provides first and second Feistel output signals 44, 46.

Half stage 42a of Feistel stage 40 includes a splitter 50a, a converter 52a, a modulator 54a, and an optional reversible optical filter 84a. Half stage 42b of Feistel stage 40 includes a splitter 50b, a converter 52b, a modulator 54b, and an optional reversible optical filter 84b. Although not illustrated in FIG. 4, each half stage 42a, 42b receives local clock signal 26a.

Splitter 50a receives first optical Feistel input signal 34 and provides first optical Feistel input signal 34 to the converter 52a and also provides first optical Feistel input signal to the phase modulator 54b of the second half stage 42b.

Converter 52a receives the first optical Feistel input signal 34 and transforms the first optical Feistel input signal 34 with irreversible function $F_1$ Converter 52a of half stage 42a includes an optical filter 70a, a photodetector 72a, and an electric filter 80a. Filter settings 71a are provided to the optical filter 70a. The optical filter 70a may be any filter which performs practical transformation consistent with function $F_1$ provided by the converter 52a being irreversible and consistent with the ability to synchronize the electrical signal arriving at modulator 54a with Feistel input signal 36 as will be described below. The optical filter 70a may be, for example, a linear filter or a non-linear filter. The optical filter 70a receives the first optical Feistel input signal 34 via splitter 50a and filters the signal 34 to provide an optically filtered signal 76a. The optically filtered signal 76a is provided to the photo detector 72a. The photo detector 72a converts the optically filtered signal 76a to a first electrical signal 53a. As a result of the conversion of the optically filtered signal 76a to the first electrical signal 53a, phase information provided by optically filtered signal 76a is discarded and the transformation of first optical Feistel input signal 34 to first electrical signal 53a is essentially irreversible. The electrical filter 80a may be, for example, a linear filter or a non-linear filter. The electrical filter 80a receives filter settings 81a. The electrical filter 80a also receives the first electrical signal 53a from the photo detector 72a of converter 52a and based upon the filter settings 81a, provides an electrically filtered first electrical signal 83a to the modulator 54a.

Modulator 54a receives first electrical signal 83a from converter 52a and implements reversible function $g_1$ to transform Feistel input signal 36. Modulator 54a includes phase modulator 82a. Modulator 82a is an electro-optic phase modulator which implements cross-phase modulation. Phase modulator 82a receives second Feistel optical input signal 36 and electrically filtered first electrical signal 83a, alters the phase of optical input signal 36 based on electrically filtered first electrical signal 83a, and provides the first phase modulated optical signal 57a to encrypter half stage 42b.

Optionally half stage 42a includes a reversible optical filter 84a which receives filter settings 85a. Preferably, half stage 42a includes at least one reversible optical filter 84a. As illustrated in FIG. 4, optical filter 84a may be used to filter first Feistel optical input signal 34 prior to receipt by splitter 50a. Alternatively, optical filter 84a may be used to filter second optical input signal 36 prior to receipt by the phase modulator 54a. Optical filter 84a may be, for example a tap-delay filter. Optical filter 84a changes the phases of the frequency components of the optical input signal 34/36.

Half stage 42b of Feistel stage 40 of the single stage Feistel encrypter 414 includes a splitter 50b, a converter 52b, a modulator 54b and an optional filter 84b. Splitter 50b receives first phase modulated signal 57a and provides first phase modulated signal 57a to the converter 52b and also provides first modulated signal 57a as the first Feistel Encrypter output 44. Alternatively, if the Feistel encrypter 14 includes additional Feistel stages 40 as illustrated in FIG. 1, the first modulated signal 57a is provided to the phase modulator 54a of the first half stage 42a of the next Feistel stage $40_{(2)}$.

Converter 52b receives first phase modulated signal 57a and transforms first phase modulated signal 57a with irreversible function $F_2$ Converter 52b of half stage 42b includes an optical filter 70b, a photodetector 72b, and an electric filter 80b. Filter settings 71b are provided to the optical filter 70b. The optical filter 70b may be any filter which performs practical transformation consistent with function $F_2$ provided by the converter 52b being irreversible and consistent with the ability to synchronize the electrical signal arriving at the modulator 54b with first modulated signal 57a as will be described below. Similar to optical filter 70a, optical filter 70b may be provided by a linear filter or a non-linear filter. Specifically, a tap-delay line optical filter having taps spaced at integer multiples of $\Delta T$ may be used. The optical filter 70b receives the first phase modulated signal 57a via splitter 50b and filters the signal 57a to provide an optically filtered signal 76b. The optically filtered signal 76b is provided to the photo detector 72b. The photo detector 72b converts the optically filtered signal 76b to a second electrical signal 53b. As a result of the conversion of the optically filtered signal 76b to the second electrical signal 53b, phase information provided by optically filtered signal 76b is discarded and the transformation of optically filtered signal 76b to second electrical signal 53*b* is essentially irreversible. The electrical filter 80*a* may be, for example, a linear filter or a non-linear filter. The electrical filter 80*b* receives filter settings 81*b*. The electrical filter 80*b* also receives the second electrical signal 53*b* from the photo detector 72*b* of converter 52*b* and based upon the filter settings 81*b*, provides an electrically filtered second electrical signal 83*b* to the modulator 54*b*.

Modulator 54*b* receives second electrical signal 83*b* from converter 52*b* and implements reversible function $g_2$ to transform Feistel input signal 34. Modulator 54*b* includes phase modulator 82*b*. Phase modulator 82*b* is an electro-optic phase modulator which implements cross-phase modulation. Phase modulator 82*b* receives first Feistel optical input signal 34 and electrically filtered second electrical signal 83*b*, alters the phase of Feistel optical input signal 34 based on electrically filtered second electrical signal 83*b*, and provides the second phase modulated optical signal 57*b* as the second Feistel encrypter output 46. Alternatively, if additional Feistel stages 40 are provided, second phase modulated optical signal 57*b* is provided to converter 52*a* of the first half stage 42*a* of the next Feistel stage $40_{(2)}$. As described above, the first and second Feistel encrypter output signals 44, 46 from the last Feistel stage are provided to the output processing circuit 16 which processes the signals to provide an optical Feistel encrypted output signal 66.

Optionally half stage 42*b* includes a reversible optical filter 84*b* which receives filter settings 85*b*. Preferably, half stage 42*b* includes at least one reversible optical filter 84*b*. As illustrated in FIG. 4, optical filter 84*b* may be used to filter first Feistel optical input signal 34 prior to receipt by phase modulator 82*b*. Alternatively, optical filter 84*b* may be used to filter first phase modulated signal 57*a* prior to receipt by converter 52*b*. Optical filter 84*b* changes the phases of the frequency components of the optical input signal 34/first phase modulated signal 57*a*.

Each subsequent Feistel stage receives the first and second modulated signals 57*a*, 57*b* from the previous Feistel stage and processes the first and second modulated signals 57*a*, 57*b* in the same manner in which the first and second optical Feistel input signals 34, 36 were processed by the first Feistel stage $40_{(1)}$. For example, in the event Feistel encrypter 14 includes two Feistel stages (i.e. the second Feistel stage $40_{(2)}$ is the final Feistel stage $40_{(n)}$), converter 52*a* of Feistel stage $40_{(2)}$ receives second modulated signal 57*b* from previous Feistel stage $40_{(1)}$ as a first Feistel input and phase modulator 54*a* of Feistel stage $40_{(2)}$ receives first modulated signal 57*a* from previous Feistel stage $40_{(1)}$ as a second Feistel input. Modulated signals 57*a*, 57*b* provided by the final Feistel stage $40_{(2)}$ are provided to the output processing circuit 16 as the first and second optical Feistel outputs 44, 46.

An aspect of the invention is the ability to manage the bandwidth of the signals throughout the encryption circuit. Data signal 28 provided to the input processing circuit 12 is a complex signal which is transformed by each function F, g provided at each Feistel stage 42 of the Feistel encrypter 14. Each transformation of a complex signal typically increases the bandwidth of the signal. Consider, for example, a signal $s_1(t)=\cos(\omega t)$. If that signal is transformed by the non-linear function $x^2$, then the resulting transformed signal is $s_2(t)=\cos^2(\omega t)$ which has a frequency double that of the original signal $s_1(t)$. This frequency doubling also indicates that the signal would double in baseband bandwidth from $0 \rightarrow \omega$ to $0 \rightarrow 2\omega$. Likewise a transformation by a function $x^3$, would result in a tripling of the bandwidth. Because each stage of the Feistel encrypter 14 transforms the signals, care must be taken to ensure that the bandwidth of the transformed signals provided by the Feistel encrypter 14 are managed. It is recognized that each non-linear transformation of the signal provided by functions g and F at each stage of encryption may result in an increase in the bandwidth width of the phase modulated signals 57*a*, 57*b*. If the bandwidth of the modulated signals 57*a*, 57*b* increases too much, then it can exceed the bandwidth of the components of the encrypter and/or the transmission network resulting in signal loss. It is not necessary that all increases in bandwidth be prevented, rather the invention provides that any increase in bandwidth is limited to the bandwidth limits of the encrypter components and the transmission channel. Thus, the invention provides for management of the bandwidth.

As described above, the Feistel input signals 34, 36 are provided by the input processing circuit 12 which includes optical sample and hold circuits 22, 242, 244. These sample and hold circuits convert the continuous optical data signal 28 into a train of discrete optical symbols having transitions and plateaus represented by the Feistel input signals 34, 36. As long as the rate of the sampling clock 26 satisfies Nyquist's criteria (1/ΔT), the symbols provided by the Feistel input signals 34, 36 retain all of the information in the original, continuous optical data signal 28. The effective bandwidth of these sample and held signals 34, 36 is directly proportional to the symbol rate. Because sampled and held signals 34, 36 have a fixed effective bandwidth, when functions F and g are applied to transform the sampled and held signals 34, 36, the effective bandwidth of the transformed signals is constrained.

In addition to providing input signals 34, 36 with a fixed bandwidth, management of the bandwidth of the signals provided by the encrypter 14 also requires alignment of the electrical and optical signals arriving at the electro-optic phase modulators 82*a*, 82*b*. A delay (other than a delay of an integer multiple of the clock period) of either the electrical or optical signal will result in a misalignment of the plateaus and transitions of these signals. If such delay occurs, the bandwidth of the resulting phase modulated signal will be increased relative to the bandwidth of the electrical and optical signals arriving at the phase modulator and each phase modulated signal provided in the subsequent half stage will further increase the bandwidth of the phase modulated signals. Alignment of the electrical signal arriving at the phase modulator with the optical signal arriving at the phase modulator is provided when the plateaus and transitions of the optical signal arriving at the phase modulator are aligned with the plateaus and transitions of the electrical signal arriving at the phase modulator. In order to achieve such alignment of the plateaus and transitions of these signals, the path lengths of the optical signal and the electrical signals may be adjusted to assure that any time delay between the electrical signal and the optical signal is an integer multiple of ΔT at the phase modulator. Methods to provide these path length adjustments are well-known. Specifically, the length of the path providing electrical signal 53*a*/83*a* to electro-optic phase modulator 82*a* and/or the length of the path providing second optical input signal 36 to the electro-optic phase modulator 82*a* may be adjusted to achieve alignment of the plateaus and transitions of the optical signal 36 with the plateaus and transitions of the electrical signal 53*a*/83*a*. Likewise, the length of the path providing electrical signal 53*b*/83*b* to electro-optic phase modulator 82*b* and/or the length of the path providing second optical input signal 34 to the electro-optic phase modulator 82*b* may be adjusted to achieve alignment of the plateaus and transitions of the optical signal 34 with the plateaus and transitions of the electrical signal 53b/83b. By providing alignment of the electrical and optical signals arriving at each phase modulator in this manner, the bandwidth to the phase modulated signals provided at each stage of the encryption can be managed. It is noted that alignment of the optical and electrical signals arriving at the electro-optic phase modulators 82a/82b may be achieved solely through path length adjustments or through path length adjustments in combination with the clock signal 26a.

Figure 5:
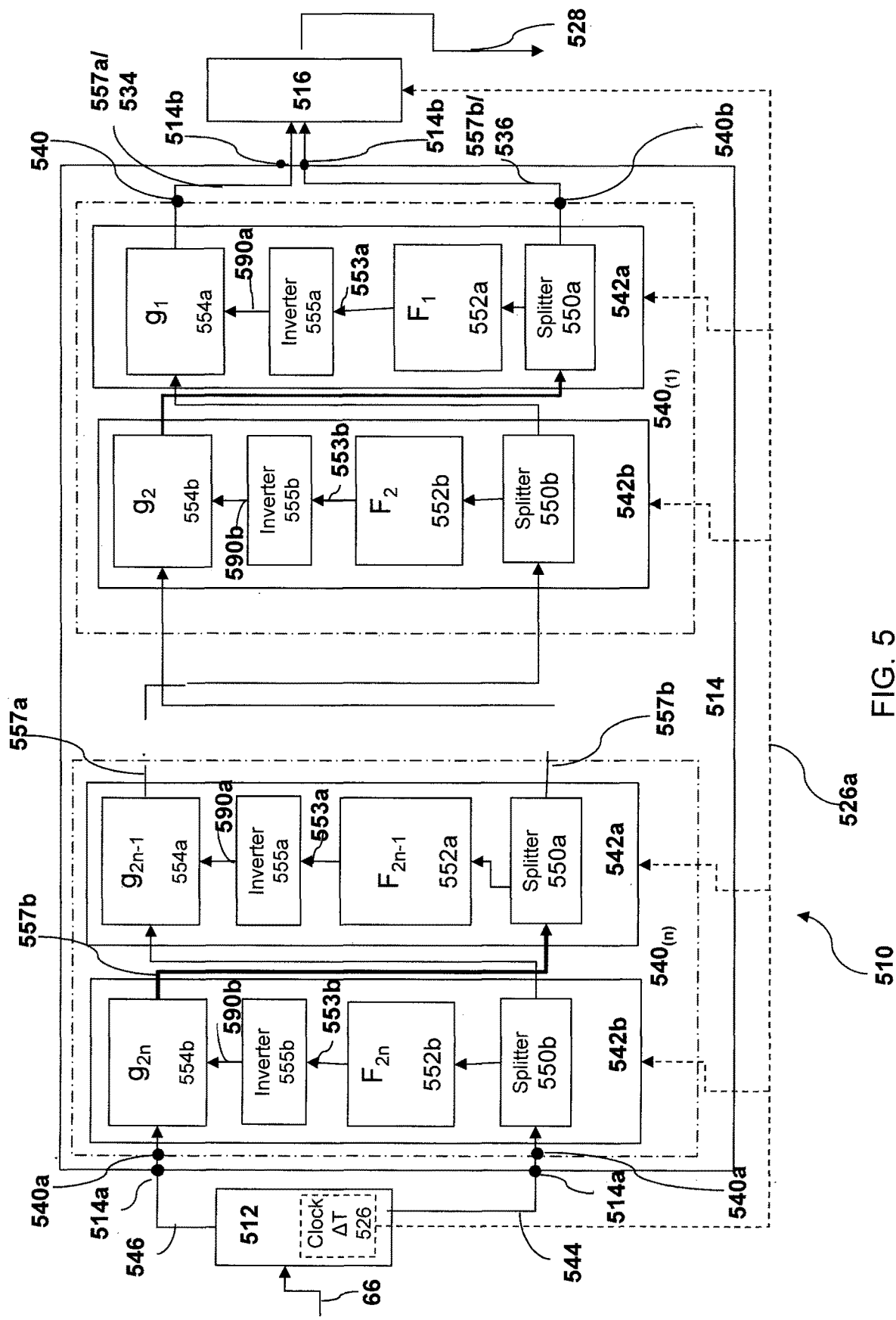
FIG. 5 illustrates an optical Feistel decryption circuit of the present invention.

A decryption circuit 510 is provided to decrypt the encrypted optical signal 66 provided by the Feistel encryption circuit 10. As illustrated in FIG. 5, the decryption circuit 510 generally includes an input processing circuit 512, a Feistel decrypter 514, and an output processing circuit 516. The input processing circuit 512 receives the encrypted optical signal 66 to be decrypted and provides a clock signal 26 and a pair of encrypted optical Feistel input signals, including first and second encrypted input signals 544, 546, to the Feistel decrypter inputs 514a of the Feistel decrypter 514. In order to decrypt the signal 66, a key must be provided to the Feistel decrypter 514. The key includes the filter settings utilized by the Feistel encrypter 14; i.e., the filter settings of the Feistel decrypter 514 must match the filter settings of the Feistel encrypter 14. Feistel decrypter 514 decrypts the first and second encrypted input signals 544, 546 and provides a pair of decrypted output signals 534, 536 at the Feistel encrypter outputs 514b.

The input processing circuit 512 includes a clock 526 providing a clock signal at a rate of $1/\Delta T$ which matches the rate of the encrypter clock 26. The input processing circuit 512 demultiplexes the encrypted optical signal 66 to provide a pair of encrypted optical Feistel input signals, including first and second encrypted input signals 544, 546. Details of the input processing circuit 512 are not illustrated, however it is understood that the input processing circuit 512 of the decryption circuit 510 may be similar to the input processing circuits 12, 212 illustrated in FIGS. 2a and 2b. It is further to be understood that sampling of the signal 66 by the input processing circuit 512 must be synchronized with signal 66 provided by the output processing circuit 16 of the encrypter 10. Proper synchronizing ensures that the input signal 66 is properly split such that encrypted signal 544 is a copy of Feistel encrypter output signal 44 and encrypted signal 546 is a copy of Feistel encrypter output signal 46.

As illustrated in FIG. 5, the Feistel decrypter 514 generally incudes a pair of decrypter inputs 514a, a pair of encrypter outputs 514b, and a series of Feistel stages $540_{(n)}$-$540_{(1)}$. The number of Feistel stages 540 provided by the Feistel decrypter 514 is the same as the number of Feistel stages 40 provided by corresponding encrypter 14 (i.e., the encrypter 14 used to encrypt the encrypted optical signal 66). Thus, the total number of Feistel stages 540 provided by the decrypter 514 is represented by n. The decryption provided by Feistel half-stages in $540_{(n)}$-$540_{(1)}$ of the decrypter 514 reverses the order of the encryption half stages provided by the Feistel half-stages in $40_{(1)}$-$40_{(n)}$ of encrypter 14. Each Feistel stage $540_{(n)}$ includes a pair of stage inputs 540a and a pair of stage outputs 540b. For example, in the event Feistel encrypter includes two Feistel stages (i.e., a first Feistel stage $40_{(1)}$ and a second/final Feistel stage $40_{(2)}$), the Feistel decrypter will also include two Feistel stages (i.e., a first Feistel stage $540_{(2)}$ of the decrypter corresponding to the final Feistel stage $40_{(2)}$ of the encrypter 14 and a second/final Feistel stage $540_{(1)}$ of the decrypter 514 corresponding to the first Feistel stage $40_{(1)}$ of the encrypter 14). The stage inputs 540a of initial Feistel stage $540_{(n)}$ provide the Feistel decrypter inputs 514a of the Feistel decrypter 514. The stage inputs 540a of the initial Feistel stage $540_{(n)}$ receive first and second encrypted input signals 544, 546 provided by the input processing circuit 512. The stage outputs 540b of the final Feistel stage $540_{(1)}$ provide the Feistel decrypter outputs 514b of the Feistel decrypter 514. The first and second decrypted output signals 534, 536 are provided at the stage outputs 540b of the final Feistel stage $540_{(1)}$ and to the output processing circuit 516.

Each Feistel stage 540 includes a pair of half stages 542b, 542a. For example, initial Feistel stage $540_{(n)}$ includes half stages 542b and 542a and final Feistel stage $540_{(1)}$ also includes half stages 542b and 542a. Thus, the number of Feistel half stages is represented by 2n. Each half stage 542b includes a splitter 550b, a converter 552b, an inverter 555b, and a modulator 554b. Each half stage 542a includes a splitter 550a, a converter 552a, an inverter 555a, and a modulator 554a. The function applied to the signals processed by the converters 552 is denoted F and the function applied to the signals processed by the modulators 554 is denoted g. Functions F and g of each decrypter half stage 542 are the same as the functions F and g provided by each corresponding encrypter half stage 42. Half stage 542b of the initial decrypter stage $540_{(n)}$ receives first and second encrypted input signals 544, 546 and provides first phase modulated signal 557b and half stage 542a provides second phase modulated signal 557a. Each Feistel half stage 542b, 542a further transforms the signals in accordance with functions F and g, thereby removing a layer of security. Additional details of the half stages 542b, 542a of a single stage Feistel decrypter 514 are provided below in connection with FIG. 6.

The output processing circuit 516 receives the first and second decrypted Feistel output signals 534, 536. The output processing circuit 516 generally incudes a time division multiplexer (Mux) (not shown) and a linear optical filter (not shown). The Mux receives the first and second decrypted Feistel output signals 534, 536, multiplexes the first and second decrypted Feistel output signals 534,536 to provide a single multiplexed Feistel decrypted signal. Filter settings are applied to the linear optical filter. The linear optical filter receives the multiplexed Feistel decrypted signal and recovers an optical decrypted recovered data signal 528 corresponding to the input data signal 28 provided to the optical scrambling circuit 10.

Figure 6:
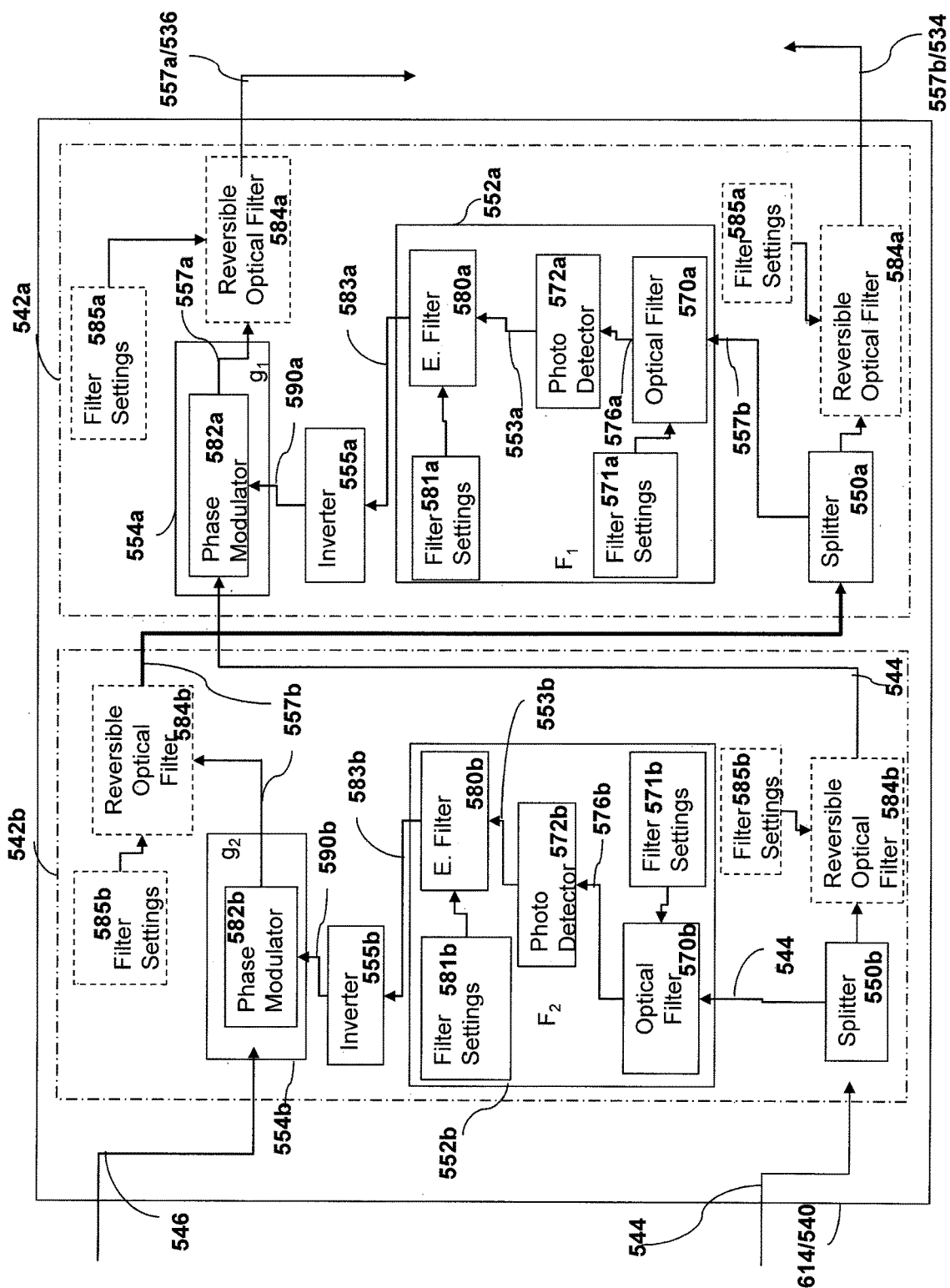
FIG. 6 illustrates a single stage Feistel decrypter of the present invention for use in the optical Feistel decryption circuit of FIG. 5.

A single stage Feistel decrypter 614 is illustrated in detail in FIG. 6. The Feistel decrypter 614 corresponds to the Feistel encrypter 414 of FIG. 4, i.e., the Feistel decrypter 614 is configured to decrypt signals encrypted by the encrypter 414. The Feistel decrypter 614 includes a single Feistel stage 540 having first and second half stages 542b and 542a.

First half stage 542b of decrypter stage 540 includes a splitter 550b, a converter 552b, an inverter 555b, a modulator 554b and an optional optical filter 584b. Converter 552b provides function $F_2$ and modulator 554b provides function $g_2$. Functions $F_2$ and $g_2$ of decrypter half stage 542b are the same as functions $F_2$ and $g_2$ of encrypter half stage 42b of the encrypter 414. Second half stage 542a of decrypter stage 540 includes a splitter 550a, a converter 552a, an inverter 555a, a modulator 554a and an optional optical filter 584a. Converter 552b provides function $F_1$ and modulator 554a provides function $g_1$. Functions $F_1$ and $g_1$ of decrypter half stage 542a are the same as functions $F_1$ and $g_1$ of encrypter half stage 42ba of the encrypter 414. Although not illustrated in FIG. 4, each half stage 542a, 542b optionally receives local clock signal 526a.

Splitter 550b receives first encrypted input signal 544 and provides first encrypted input signal 544 to the converter 552b and also provides first encrypted input signal 544 to the phase modulator 554a of the second half stage 542a.

Converter 552b of half stage 542b includes an optical filter 570b, a photodetector 572b, and an electric filter 580b. Filter settings 571b are provided to the optical filter 570b. Filter settings 571b are the same as the filter settings 71b provided to the optical filter 70b of the corresponding encrypter. The optical filter 570b with filter setting 571b performs the same function as corresponding optical filter 70b of the encrypter 414 with filter settings 71b. The optical filter 570b receives the first encrypted input signal 544 via splitter 550b and filters the signal 544 to provide an optically filtered signal 576b. The optically filtered signal 576b is provided to the photo detector 572b. The photo detector 572b converts the optically filtered signal 576b to a first electrical signal 553b. As a result of the conversion of the optically filtered signal 576b to the first electrical signal 553b, phase information provided by optically filtered signal 576b is discarded and the transformation of first encrypted input signal 544 to first electrical signal 553b is essentially irreversible. The electrical filter 580b receives filter settings 581b which are the same as the filter settings 81b provided to the optical filter 80b of the corresponding encrypter 414. The electrical filter 580b with filter setting 581b provides the same function as the corresponding electrical filter 80b of the encrypter 414 with filter settings 81b. The electrical filter 580b receives the first electrical signal 553b from the photo detector 572b of converter 552b and based upon the filter settings 581b, provides an electrically filtered first electrical signal 583b to the inverter 555b.

Inverter 555b inverts the electrically filtered signal 583b to provide an inverted electrical signal 590b. Inverted electrical signal 590b is provided to the phase modulator 582b of the modulator 554b. This enables the phase modulator 582b to reverse the effect of phase modulator 82b.

Modulator 554b includes phase modulator 582b. Phase modulator 582b is an electro-optic phase modulator which implements cross-phase modulation. Phase modulator 582b receives second encrypted input signal 546 and inverted electrically filtered first electrical signal 590b, alters the phase of second encrypted input signal 546 based on inverted electrically filtered first electrical signal 590b, and provides the first phase modulated optical signal 557b to the splitter 550a of the second decrypter half stage 542a.

Optionally half stage 542b includes a reversible optical filter 584b which receives filter settings 585b which are the inverse of filter settings 85b provided to the optical filter 84b of the corresponding encrypter 414 such that, optical filter 584b provides the inverse of the function provided by optical filter 84b of encrypter 414. As illustrated in FIG. 6, optical filter 584b may be used to filter first encrypted input signal 544 from the splitter 550b. Alternatively, optical filter 584b may be used to filter phase modulated signal 557b. Optical filter 584b changes the phases of the frequency components of the encrypted input signal 544 or phase modulated signal 557b.

Splitter 550a receives first phase modulated signal 557b and provides first phase modulated signal 557b to the converter 552a and also provides first modulated signal 557b as the first decrypted Feistel output signal 534. Alternatively, if the Feistel decrypter 614 includes additional Feistel stages 540, the first modulated signal 557b is provided to the converter 552b of the first half stage 542b of the next Feistel stage 540$_{(n-1)}$.

Converter 552a of half stage 542a includes an optical filter 570a, a photodetector 572a, and an electric filter 580a. Filter settings 571a are provided to the optical filter 570a. Filter settings 571a are the same as filter settings 71a provided to the optical filter 70a of the corresponding encrypter. The optical filter 570a performs the same function as corresponding optical filter 70a of the encrypter 414. The optical filter 570a receives the modulated signal 557b via splitter 550a and filters the signal 557b to provide an optically filtered signal 576a. The optically filtered signal 576a is provided to the photo detector 572a. The photo detector 572a converts the optically filtered signal 576a to a second electrical signal 553a. As a result of the conversion of the optically filtered signal 576a to the second electrical signal 553a, phase information provided by optically filtered signal 576a is discarded and the transformation of first phase modulated signal 557b to second electrical signal 553a is essentially irreversible. The electrical filter 580a receives filter settings 581a which are the same as the filter settings 81a provided to the optical filter 80a of the corresponding encrypter 414. The electrical filter 580a provides the same function as the electrical filter 80a of the encrypter 414. The electrical filter 580a receives the first electrical signal 553a from the photo detector 572a of converter 552a and based upon the filter settings 581a, provides an electrically filtered second electrical signal 583a to the inverter 555a.

Inverter 555a inverts the electrically filtered signal 583a to provide an inverted second electrical signal 590a. Inverted second electrical signal 590a is provided to the phase modulator 554a. This enables the phase modulator 582a to reverse the effect of phase modulator 82a.

Modulator 554a includes phase modulator 582a. Phase modulator 582a is an electro-optic phase modulator which implements cross-phase modulation. Phase modulator 582a receives first encrypted input signal 544 and inverted electrically filtered second electrical signal 590a, alters the phase of first encrypted input signal 544 based on inverted electrically filtered second electrical signal 590a, and provides the second phase modulated optical signal 557a as the second decrypted Feistel output signal 536. Alternatively, if additional Feistel stages 40 are provided, second phase modulated optical signal 557a is provided to the phase modulator 554b of the first half stage 42b of the next Feistel stage 40$_{(n-1)}$.

Optionally half stage 542a includes a reversible optical filter 584a which receives filter settings 585a which make filter 584a the inverse of filter 84a of the corresponding encrypter 414. Optical filter 584a provides the inverse of the function provided by optical filter 84a of encrypter 414. As illustrated in FIG. 6, optical filter 584a may be used to filter second phase modulated signal 557a. Alternatively, optical filter 584a may be used to filter first phase modulated signal 557b. Optical filter 584a changes the phases of the frequency components of the optical input signal first/second phase modulated signal 557a/557b.

In the event a multiple stage decrypter is used, each subsequent Feistel stage receives the first and second modulated signals 557a, 557b from the previous Feistel stage and processes the first and second modulated signals 557a, 557b in the same manner in which the first and second encrypted input signal 544, 546 were processed by the first Feistel stage 540$_{(1)}$. For example, in the event Feistel decrypter 514 includes two Feistel stages (i.e., a first Feistel decrypter stage 540$_{(2)}$ corresponding to a final Feistel encrypter stage 40$_{(2)}$ and a second/final Feistel decrypter stage 540$_{(1)}$ corresponding to an initial Feistel encrypter stage 40$_{(1)}$), the second/final Feistel decrypter stage 540$_{(1)}$ receives first phase modulated signal 557b at splitter 550b as a first encrypter input signal and second phase modulated signal 557a at phase modulator 582b as a second encrypter input signal. Modulated signals 557a, 557b provided by the final Feistel decrypter stage 540$_{(1)}$ are provided to the output processing circuit 516 as the first and second decrypted Feistel output signals 534, 536.

Figure 7:
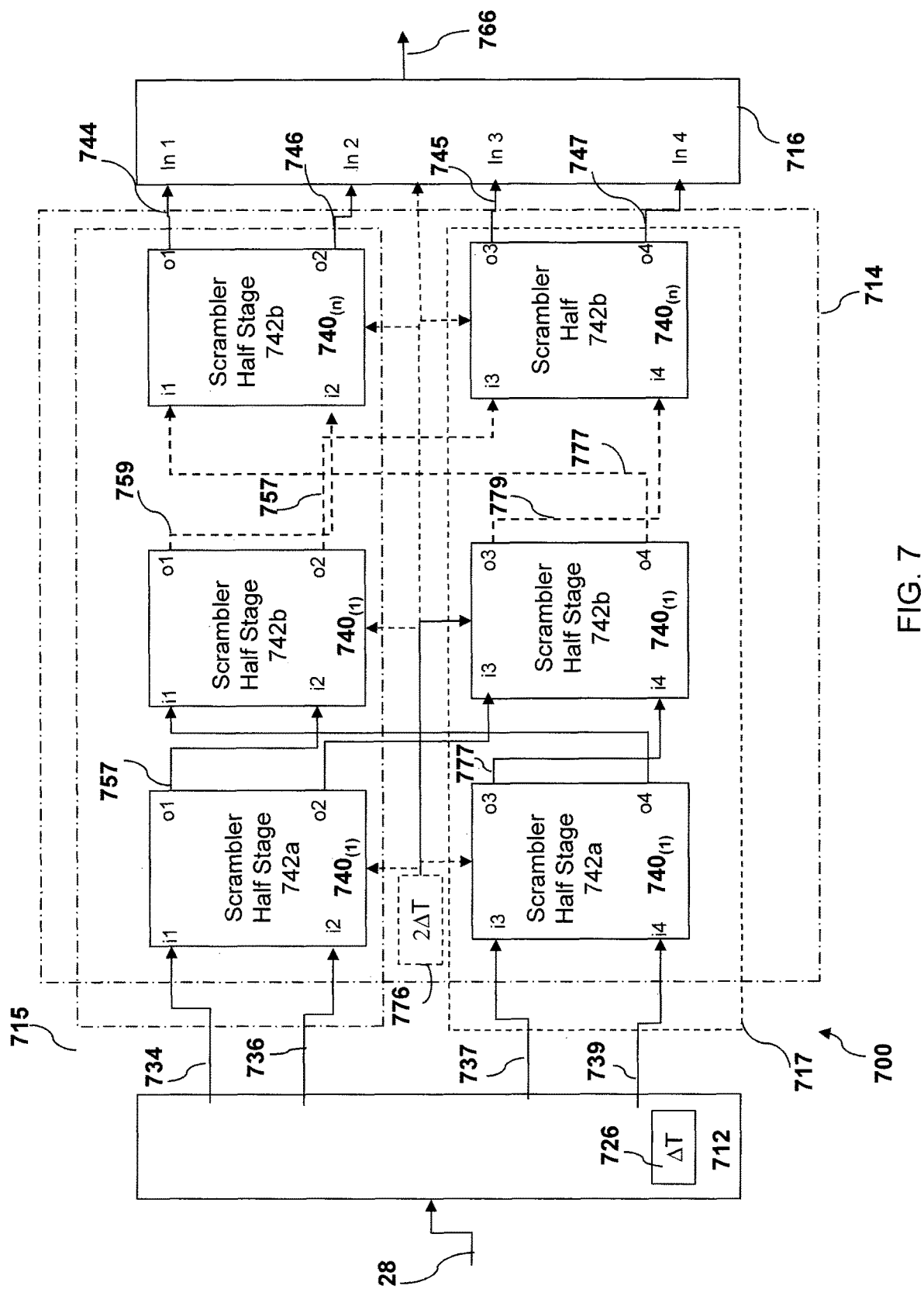
FIG. 7 illustrates a multi-stage Feistel encrypter of the present invention having four Feistel inputs along with an output processing circuit.

Expansion of the optical Feistel encryption circuit 10 is illustrated in FIG. 7 and provides a dual-arm Feistel encryption circuit 700. The dual-arm Feistel encryption circuit 700 includes an input processing circuit 712, a Feistel encrypter 714, and an output processing circuit 716. The input processing circuit 712 receives incoming optical data signal 28. Although details of the input processing circuit 712 are not illustrated, the input processing circuit 712 may be similar to the input processing circuit 12 illustrated in FIG. 2a with the exception that the demultiplexer (not shown) of the input processing circuit 712 splits the sampled and held optical signal into four separate Feistel input signals, providing sampled and held input signals 734, 736, 737, 739 to be encrypted by the Feistel encrypter 714. The input processing circuit 712 includes a clock 726 for sampling of the incoming data optical signal 28 at intervals ΔT.

Feistel encrypter 714 includes two Feistel arms 715, 717. Each Feistel arm 715, 717 includes a plurality of Feistel stages 740. Each Feistel stage 740$_{(1)}$-740$_{(n)}$ includes a pair of half stages 742a, 742b. A clock 776 may be provided to each half-stage of each Feistel arm 715, 717. Clock 776 may be derived from clock 726 with a frequency divider circuit. Because two Feistel arms are provided for encryption of the Feistel input signal 734, 736, 737, 739, the clock 776 may be used for synchronization of the signals in the half stages 740. Additionally, the half stages 740 may operate at half the speed of the single arm Feistel because the dual arm Feistel encryption circuit 700 provides a parallel architecture for processing incoming data signal 28.

Although details of the half stages 742a, 742b are not illustrated, the half stages 42a, 42b are representative of the half stages 742a, 742b. As illustrated in FIG. 7, each half stage 742a, 742b provides a pair of input nodes and a pair of output nodes. The input nodes of the half stages 742a, 742b of the first arm 715 are labeled i1 and i2 and input nodes of the half stages 742a, 742b of the second arm 717 are labeled i3 and i4. Input nodes i1, i2 of the first half stage 742a of first arm 715 receive a pair of sample and held Feistel input signals 734, 736. Input nodes i3, i4 of the first half stage 742a of second arm 717 receive a pair of sample and held Feistel input signals 737, 739.

The output nodes of the half stages 742a, 742b of the first arm 715 are labeled o1 and o2 and the output nodes of the half stages 742a, 742b of the second arm 717 are labeled o3 and o4. Output node o1 of encrypter half stage 742a of first arm 715 provides a first phase modulated signal 757; output node o1 of encrypter half stage 742b of first arm 715 provides a second phase modulated signal 759; output node o3 of encrypter half stage 742a of second arm 717 provides a third phase modulated signal 777; and output node o3 of encrypter half stage 742b of second arm 717 provides a fourth phase modulated signal 779. As illustrated in FIG. 7 outputs of the first Feistel arm are optically connected to inputs of the second Feistel arm and outputs of the second Feistel arm are optically connected to inputs of the first Feistel arm. By interconnecting the Feistel arms in this manner, the Feistel encrypter is expanded to accommodate additional input signals. The ability to accommodate additional input signals using additional arms allows for the use of slower components, thereby reducing the cost of the device.

Although a particular arrangement of the interconnection between multiple Feistel arms is illustrated in FIG. 7, it is to be understood, however, that other arrangements of the interconnections between the Feistel arms may be used. The specific arrangement of interconnections between Feistel arms 715, 717 illustrated in FIG. 7 provides optically connecting output o2 of encrypter half stage 742a of the first encrypter arm 715 to input i3 of encrypter half stage 742b of the second Feistel arm 717; optically connecting output o4 of encrypter half stage 742a of the second encrypter arm 717 to input i1 of encrypter half stage 742b of the first Feistel arm 715. In this manner, a portion of the signals received by the first arm 715 of the Feistel encrypter 714 are scrambled with a portion of the signals received by the second arm 717 of the Feistel encrypter 714.

As illustrated in FIG. 7, the output signals 744, 745, 746, 747 of the final half stage 742b provide the optical Feistel outputs of the Feistel encrypter 714. An output processing circuit 716 includes four input nodes which receive the output signals 744, 745, 746, 747 provided by the Feistel encrypter 714. The output processing circuit 716 multiplexes the optical Feistel outputs 744, 745, 746, 747 to provide an encrypted optical data signal 766. Output processing circuit 716 receives local clock signal 726 and assists with management of the bandwidth of the encrypted data signal 766.

Figure 8:
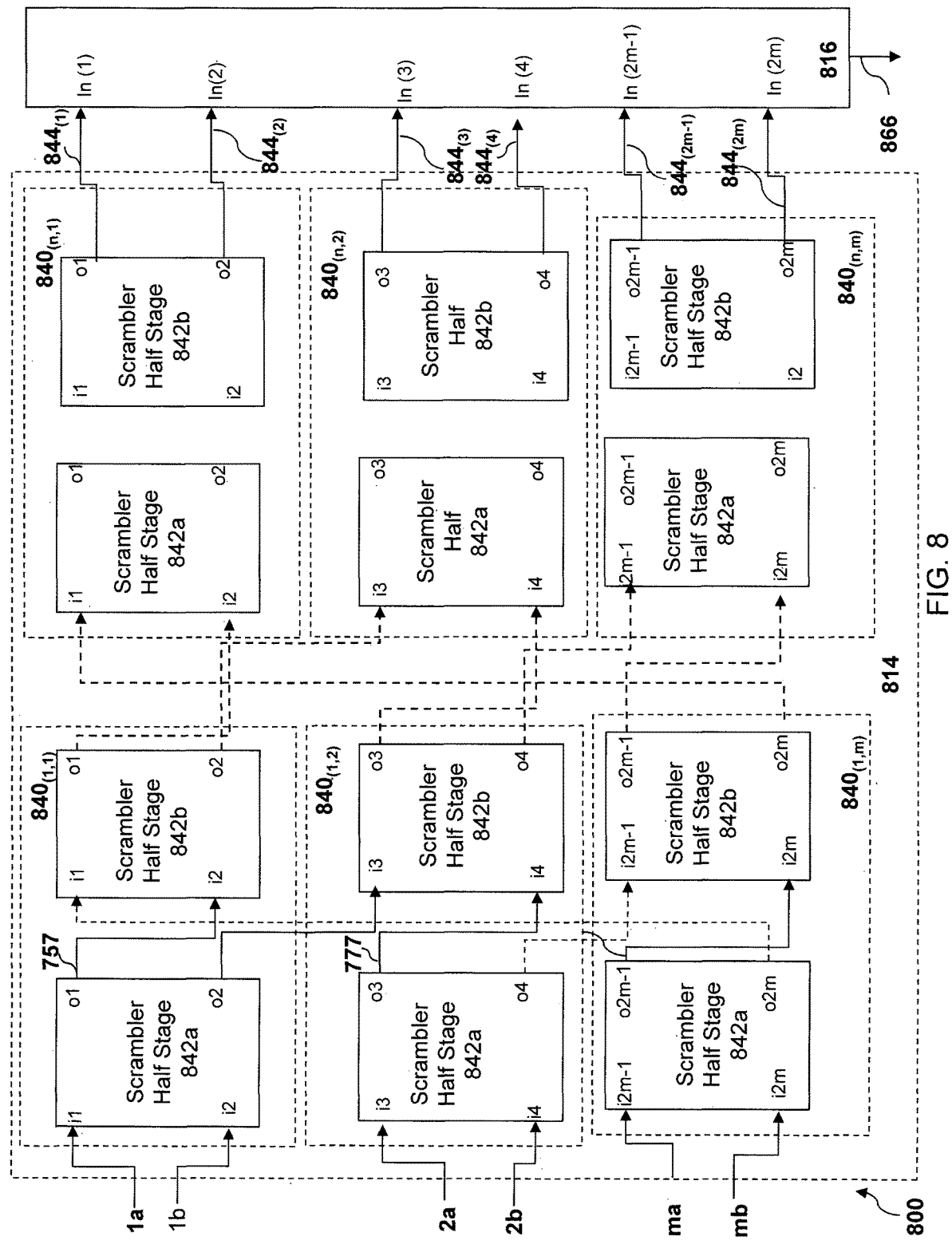
FIG. 8 illustrates a portion of an optical Feistel encryption circuit of the present invention including a Feistel encrypter having m pairs of Feistel inputs and n Feistel stages.

Expansion of the optical Feistel encryption circuit 10 for encrypting 2m sampled and held input signals utilizing n Feistel stages is illustrated in FIG. 8. The optical encryption circuit includes an input processing circuit, Feistel encrypter 814, and an output processing circuit 816. It is to be understood that the input processing circuit may include characteristics similar to the input processing circuits illustrated in FIGS. 1, 2a, 2b and 7 while providing 2m sampled and held input signals (1a, 1b, 2a, 2b, . . . ma, mb). The input processing circuit includes a clock providing sampling at intervals ΔT.

Feistel encrypter 814 is a multi-arm Feistel encrypter including m Feistel arms with each Feistel arm including n Feistel stages 840. Thus, each Feistel stage is referenced with the notation 840$_{(n,m)}$. Each Feistel stage includes a pair of half stages 842a, 842b. Although details of the half stages 842a, 842b are not illustrated, the half stages 42a, 42b of FIGS. 1 and 4 are representative of the half stages 842a, 842b. As illustrated in FIG. 8, each half stage 842a, 842b provides a pair of input nodes and a pair of output nodes. A local sampling clock signal (not shown) is optionally provided to each scrambler half stage 842a, 842b. The input nodes of each initial half stage receive a pair of sample and held Feistel input signals 1a, 1b, 2a, 2b, . . . ma, mb. Sampled and held input signals 1a, 1b, 2a, 2b, . . . ma, mb are multiplexed and provided to inputs of the first half stages of each arm 840$_{(1)}$-840$_{(m)}$. Each arm scrambles the optical signals 1a, 1b, 2a, 2b, . . . ma, mb and the scrambler half stages may operate at the rate of 1/mx ΔT; i.e., for each additional arm provided in the multi-arm Feistel encrypter the period of the local sampling clock may be increased.

Although a particular arrangement of the interconnections between multiple Feistel arms is illustrated in FIG. 8, it is to be understood however, that various arrangements of the interconnections between the Feistel arms may be used. For example, each half stage provides two outputs $o_j$ and two inputs $i_k$ and each output associated with an odd j is provided to an input associated with an even k. i.e., for each connection between $o_j$ and $i_k$, j+k is odd. The specific arrangement of interconnections between Feistel arms illustrated in FIG. 8 provides optically connecting a first output of an encrypter half stage 842a to an input of a subsequent half stage of the same Feistel arm and for optically connecting a second output of an encrypter half stage 842a to an input of a succeeding half stage of a different Feistel arm. In this manner, a portion of the signals received by one arm of the Feistel encrypter 814 are scrambled with a portion of the signals received by another arm of the Feistel encrypter 814.

Completion of the processing provided by the Feistel encrypter 814, results in Feistel output signals $844_{(1)}$-$844_{(2m)}$ having the original data rate provided by input signals 1a, 1b, 2a, 2b, . . . ma, mb. In the same manner described above in connection with the Feistel encryption circuits 14, 414 of FIGS. 1 and 4, Feistel encryption circuit 814 provides managed bandwidth of the output signals $844_{(1)}$-$844_{(2m)}$. More specifically, by utilizing sampled and held input signals 1a, 1b, 2a, 2b, . . . ma, mb and by aligning the electrical signal provided to each phase modulator with the optical signal provided to each phase modulator, the bandwidth at each half stage 842a, 842b can be managed/restrained despite the functions F and g applied to each signal.

The output signals $844_{(1)}$-$844_{(2m)}$ of the encrypter arms are provided to the output processing circuit 816 along with the local sampling clock. The output processing circuit 816 multiplexes the output signals $844_{(1)}$-$844_{(2m)}$ to provide the encrypted optical data signal 866. The output 866 of the output processing circuit 816 will have an average data rate that is 2m times faster than that of any one multiplexor input.

Figure 9A:
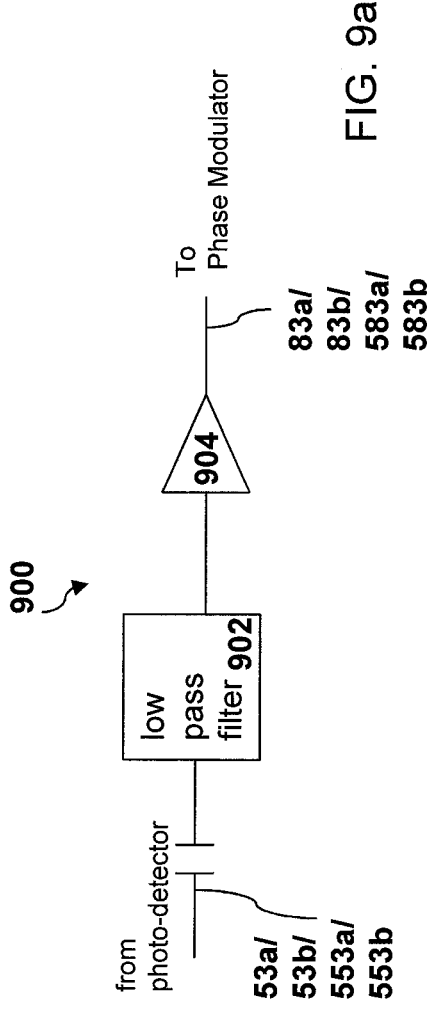
FIG. 9a illustrates an embodiment of an electrical filter for use in connection with the Feistel encrypter of the present invention.
Figure 9B:
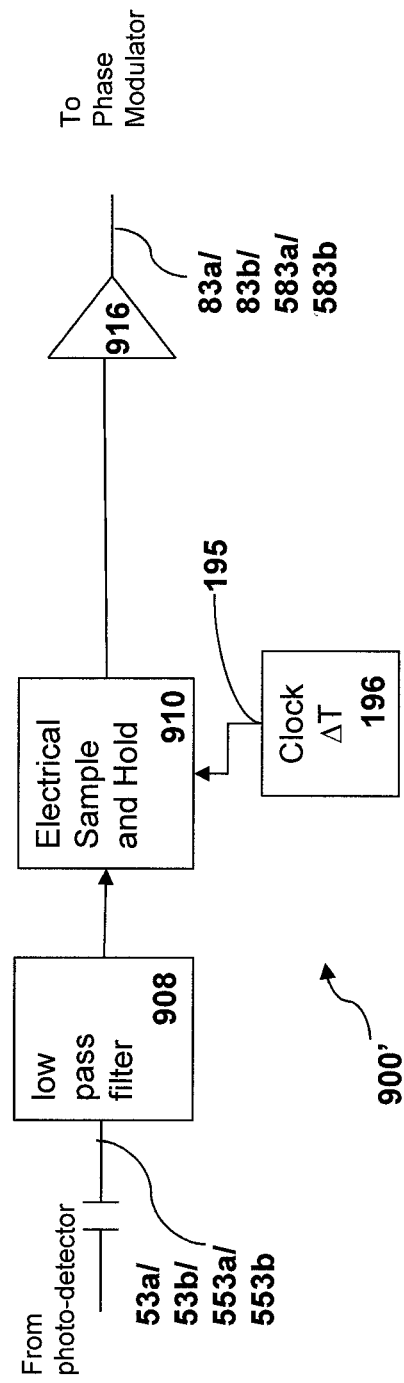
FIG. 9b illustrates an alternative embodiment of the electrical filter for use in connection with the Feistel encrypter of the present invention.

FIGS. 9a and 9b illustrate two sample embodiments 900 and 900' of the electrical filters 80a, 80b, 580a, 580b illustrated in FIGS. 4 and 6. Electrical filter 900 of FIG. 9a provides the advantage that the filter is simple to implement. Although, electrical filter 900' of FIG. 9b is more complex, the contribution of noise resulting from filter 900' is less than the contribution of noise resulting from filter 900 and the photodetector can operate at a lower bandwidth. It is noted that care should be given to ensure that the electrical signal provided to the phase modulator is the same at each corresponding stage for encryption and decryption.

As illustrated in FIG. 9a, the electrical filter 900 includes a tapped delay line electrical filter 902 having taps spaced at integer multiples of ΔT and an amplifier 904. Filter 902 receives the analog electrical signal 53a/53b/553a/553b provided by the photo detector 72a/72b/572a/572b and filters the electrical signal 53a/53b/553a/553b to provide additional scrambling of the signal. The filtered electrical signal is then amplified via amplifier 904. Amplifier 904 may be a non-linear amplifier with gain control, e.g., to convert a signal with a peaked probability distribution into one with a more uniform distribution. The amplified filtered electrical signal 83a/83b is provided to the phase modulator 82a/82b and filtered electrical signal 583a/583b is provided to the inverter 555a/555b before being processed by phase modulator 582b/582a.

As illustrated in FIG. 9b, the electrical filter 900' includes a low pass filter 908, an electrical sample and hold 910 and an amplifier 916 (possibly non-linear, as with amplifier 904). The low pass filter 908 receives the electrical signal 53a/53b/553a/553b provided by the photo detector 72a/72b/572a/572b and filters the electrical signal 53a/53b/553a/553b. The filtered signal is provided to the electrical sample and hold 910 which also receives a clock signal 195 provided by clock 196. The sample and hold 910 converts the filtered signal to a sampled and held signal. The sampled and held signal is provided to amplifier 916 and the amplified signal 83a/83b is provided to the phase modulator 82a/82b and amplified signal 582a/582b is provided to inverter 555b/555a before being processed by phase modulator 582b/582a. The clock signal 195 allows for alignment of the electrical signal 83a/83b/583a/583b arriving at the phase modulator 82a/82b/582a/582b with the sampled and held optical signals 34/36/544/546 arriving at the phase modulator 82a/82b/582a/582b. Alternatively, this alignment may be achieved by adjusting the path lengths of the signals.

Figure 10:
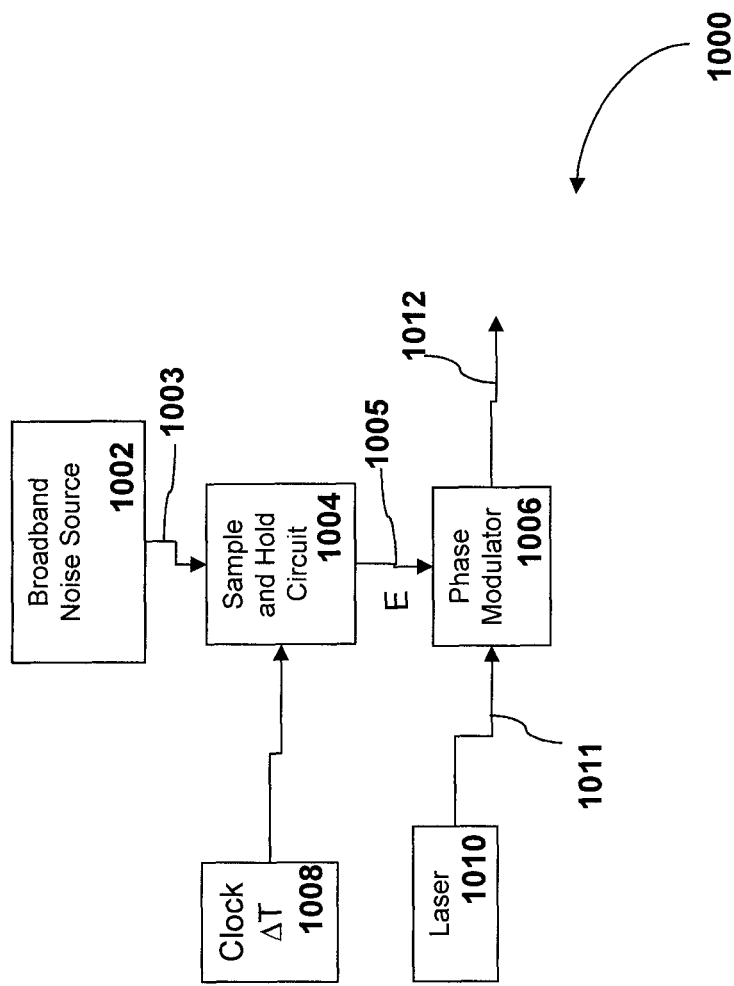
FIG. 10 illustrates a decoy signal generator for use with the optical Feistel encryption circuit of the present invention.

A decoy signal generator is illustrated in FIG. 10. The decoy signal generator 1000 generates an input signal 1012 for substitution of some portion of input signals 34/36/544/546/734/736/737/739/1a/1b/2a/2b/ . . . ma/mb to the Feistel encrypter 14/414/714/814. The decoy signal generator includes a broadband noise source 1002, a sample and hold circuit 1004, a phase modulator 1006, a clock 1008, and a laser 1010 producing an optical signal 1011. The broadband noise source 1002 generates a broadband electrical noise signal 1003. The sample and hold circuit receives the electrical noise signal 1003 and a clock signal 1008 derived from the clock 26. The sample and hold circuit 1004 samples the noise signal 1003 to provide an electrical sampled and held noise signal 1005. Phase modulator 1006 receives the sampled and held electrical noise signal 1005 and the optical signal 1011 and provides phase modulated decoy signal 1012. Decoy signal 1012 may be used to further obscure the optical data signal.

Several advantages are provided by the optical encryption circuit of the present invention. The invention provides increased security for extremely broadband fiber optic signals because it provides a mechanism for security that is complementary to digital encryption and can operate in tandem with it. It is not dependent on the particular modulation format of the optical signal, so it can be useful in a broad range of practical network environments.

Another advantage is that the invention removes the need for analog to digital conversion of the optical signal. More specifically, the optical Feistel encryption circuit encrypts an optical signal's amplitude and phase without first demultiplexing to the logical layer in the optical signal. By encrypting/scrambling the optical signal by operating on light directly in the physical layer, rather than on the logical (bit) layer, using components that act directly on phase and magnitude of the optical signal, the invention removes the need for analog-to-digital conversion thereby eliminating the need for expensive FPGA or ASIC.

Yet another advantage of the invention is that encryption of the sampled and held optical data signal through operation of light directly in the physical layer modifies the phase and amplitude of the optical signal in a manner that cannot be reversed without knowledge of the encrypter key provided by the encrypter settings. Furthermore, the encryption is implemented with a combination of linear and nonlinear transformations making it more difficult for an eavesdropper to decipher, relative to a linear scrambler for which there are well-known vulnerabilities.

Further still an advantage provided by the optical Feistel encryption circuit 10 is that the optical sample and hold circuit 22/242/244 of the input processing circuit 12/212 is driven by a local sample clock 26 which may also be distributed to the encrypter 14. Thus, acquisition of the data clock associated with the incoming optical signal 28 is not required. It is noted, however, that decryption will likely require recovery of the sample clock.

Another advantage provided by the present invention is that the bandwidth of the optical signal within the encrypter is managed in spite of the application of nonlinear scrambling functions. Although such functions typically expand the bandwidth of an optical signal, scrambling/encryption of the present invention does not increase the signal bandwidth in an appreciable way. Management of the bandwidth is accomplished by sampling and holding the signals to satisfy Nyquist's criteria before performing the nonlinear operations and through alignment of the signal undergoing transformation with the signal providing the transformation (i.e., alignment of the electrical and optical signals arriving at the phase modulator). Furthermore, because each such alignment occurs at each scrambling stage, additional scrambling stages, including non-linear functions, may be provided to allow for increased security without appreciably increasing the signal bandwidth.

The Feistel encrypter 14 enables parallel processing utilizing lower bandwidth components. For example, a high speed serial optical signal may be divided into multiple parallel processing pathways, where each pathway utilizes components having lower bandwidth capabilities than would otherwise be required if a single pathway was provided to process the signal. Specifically, the separation of the signal into multiple arms/parallel paths enables the use of optoelectronic components within the encrypter operating at a reduced clock speed relative to the high speed serial input.

The Feistel encrypter 14 may be expanded to provide an additional arm(s) for receiving a decoy signal(s) further providing security to the data signal 28.

The present invention also provides for simplified correction of channel distortion caused by impairments in the transmission of the Feistel encrypted output signal 66. More specifically, the filter settings of the input processing circuit 512 of the decrypter 510 may be modified to correct this channel distortion, which must first be characterized separately.

While embodiments of the present invention are shown and described, it is envisioned that those skilled in the art may devise various modifications of the present invention without departing from the spirit and scope of the appended claims.

The invention claimed is:

1. An optical encryption circuit comprising:
a Feistel encrypter, for encrypting a pair of optical Feistel input signals, including a first input signal and a second input signal and providing a pair of optical Feistel output signals including a first output signal provided at a first Feistel encrypter output and a second output signal provided at a second Feistel encrypter output, the Feistel encrypter comprising;
at least one Feistel stage including first and second half stages, each of the first and second half stages includes, first and second inputs, a splitter, a converter, a modulator, and first and second outputs;
the splitter of the first half stage receives the first input signal and provides the first input signal to the converter of the first half stage and to the modulator of the second half stage;
the converter of the first half stage includes a photodetector and at least one programmable filter, receives the first input signal and converts the first input signal to a first electrical signal;
the modulator of the first half stage includes a phase modulator, receives the second input signal and the first electrical signal and modulates the second input signal based upon the first electrical signal to provide a first phase modulated optical signal;
the splitter of the second half stage receives the first phase modulated optical signal and provides the first phase modulated optical signal to the converter of the second half stage and to a first output of the Feistel stage;
the converter of the second half stage includes a photodetector and at least one programmable filter, the converter receives the first phase modulated signal and converts the first phase modulated signal to a second electrical signal;
the modulator of the second half stage includes a phase modulator, receives the first input signal from the splitter of the first half stage and the second electrical signal and modulates the first input signal based upon the second electrical signal to provide a second phase modulated optical signal to a second output of the Feistel stage.

2. The optical encryption circuit of claim 1, wherein the first and second input signals are sampled and held signals;
wherein the second input signal and the first electrical signal received by the phase modulator of the first half stage are aligned; and
wherein the first input signal and the second electrical signal received by the phase modulator of the second half stage are aligned.

3. The optical encryption circuit of claim 1, wherein the Feistel encrypter further includes a local sampling clock providing a local sampling clock signal to each half stage.

4. The optical encryption circuit of claim 1, wherein the Feistel encrypter includes a single Feistel stage and the first output of the Feistel stage provides the first Feistel encrypter output and the second output of Feistel stage provides the second Feistel encrypter output.

5. The optical encryption circuit of claim 1, wherein the Feistel encrypter includes multiple Feistel stages, a first Feistel stage receives the first and second input signals and provides the first and second phase modulated optical signals as Feistel inputs to a successive Feistel stage, and the first and second phase modulated optical signals of a final Feistel stage provide the first and second Feistel encrypter outputs of the Feistel encrypter.

6. The optical encryption circuit of claim 1, wherein each Feistel half stage further includes a reversible optical filter.

7. The optical encryption circuit of claim 1, wherein each Feistel half stage further includes an electrical filter and wherein the first electrical signal is filtered by the electrical filter of the first half stage and the second electrical signal is filtered by the electrical filter of the second half stage.

8. The optical encryption circuit of claim 1, wherein said first half stage further includes an optical filter for filtering the first input signal prior to conversion by the photodetector of the first half stage and said second half stage further includes an optical filter for filtering the first phase modulated signal prior to conversion by the photodetector of the second half stage.

9. The optical encryption circuit of claim 1, wherein the optical encryption circuit comprises multiple Feistel arms; and wherein each Feistel arm receives a pair of optical Feistel input signals, and wherein an output of a Feistel stage in a first arm is provided to an input of a Feistel stage of a second arm.

10. The optical encryption circuit of claim 9, wherein the pair of optical Feistel input signals provided to at least one Feistel arm are decoy signals.

11. The optical encryption circuit of claim 1, further comprising an input processing circuit wherein the input processing circuit receives an optical data signal and provides a sampling clock signal and the pair of optical Feistel input signals based on the optical data signal to the Feistel encrypter.

12. The optical encryption circuit of claim 11, wherein the input processing circuit includes:
- a reversible optical filter for receiving the optical data signal and providing a filtered optical data signal;
- an optical sample and hold circuit for receiving the filtered optical data signal and the local sampling clock and for providing a sampled and held data signal; and
- a demultiplexer for receiving the local sampling clock and the sampled and held data signal and for providing the pair of optical Feistel input signals.

13. The optical encryption circuit of claim 11, wherein the input processing circuit includes:
- a reversible optical filter for receiving the optical data signal and providing a filtered optical data signal;
- a splitter for receiving the filtered optical data signal and providing first and second filtered optical data signals, and wherein a delay is provided to said second filtered optical data signal;
- a local sampling clock;
- a first optical sample and hold circuit for receiving the first filtered optical data signal and the local sampling clock to provide the first optical Feistel input signal; and
- a second optical sample and hold circuit for receiving the delayed second filtered optical data signal and the local sampling clock to provide the second optical Feistel input signal.

14. The optical encryption circuit of claim 1, further including:
- an output signal processing circuit.

15. The optical encryption circuit of claim 14, wherein the output signal processing circuit incudes:
- a time division multiplexer for receiving the first and second optical Feistel output signals and multiplexing the first and second optical Feistel output signals to provide a multiplexed optical signal; and
- a linear optical filter for receiving the multiplexed optical signal and providing a Feistel encrypted optical output signal.

16. An optical decryption circuit comprising:
- a Feistel decrypter for decrypting an encrypted data signal represented by a pair of encrypted optical Feistel input signals, including a first encrypted Feistel input signal and a second encrypted Feistel input signal and providing a pair of decrypted optical Feistel output signals, including a first output signal provided at a first Feistel decrypter output and a second output signal provided at a second Feistel decrypter output, the Feistel decrypter comprising:
- at least one Feistel stage including first and second half stages, each of the first and second half stages includes first and second inputs, a splitter, a converter, an inverter, a modulator, and first and second outputs;
- the splitter of the first half stage receives the first encrypted Feistel input signal and provides the first encrypted Feistel input signal to the converter of the first half stage and to the modulator of the second half stage;
- the converter of the first half stage includes a photodetector and at least one programmable filter configured to match a programmable filter of an encrypter used to encrypt the encrypted data signal, the converter receives the first encrypted Feistel input signal and converts the first encrypted Feistel input signal to a first electrical signal;
- the inverter of the first half stage receives the first electrical signal and inverts the first electrical signal to provide an inverted first electrical signal;
- the modulator receives the second encrypted Feistel input signal and the inverted first electrical signal and modulates the second encrypted Feistel input signal based upon the inverted first electrical signal to provide a, first phase modulated optical signal;
- the splitter of the second half stage receives the first phase modulated optical signal and provides the first phase modulated optical signal to the converter of the second half stage and to a first output of the Feistel stage;
- the converter of the second half stage, includes a photodetector and at least one programmable filter configured to match a programmable filter of the encrypter used to encrypt the encrypted data signal, the converter receives the first phase modulated optical signal and converts said first phase modulated signal to a second electrical signal;
- the inverter of the second half stage receives the second electrical signal and inverts the second electrical signal to provide an inverted second electrical signal;
- the modulator of the second half stage, receives the first encrypted Feistel input signal from the splitter of the first half stage and the inverted second electrical signal and modulates the first encrypted Feistel input signal based upon the inverted second electrical signal to provide a second phase modulated signal to a second output of the Feistel stage.

17. The optical decryption circuit of claim 16, wherein each stage of the Feistel decrypter corresponds to a stage of a Feistel encrypter used to encrypt the data signal.

18. The optical decryption circuit of claim 16, wherein the Feistel decrypter comprises: multiple Feistel stages and each successive Feistel stage receives the signals at the outputs of a previous Feistel stage as the pair of encrypted optical Feistel input signals.

19. The optical decryption circuit of claim 16, wherein each Feistel half stage further includes a reversible optical filter and wherein one of said pair of encrypted optical Feistel input signals is filtered using the reversible optical filter.

20. The optical decryption circuit of claim 16, wherein each Feistel half stage further includes an electrical filter and wherein the first electrical signal is filtered by the electrical filter of the first half stage and the second electrical signal is filtered by the electrical filter of the second half stage.

21. The optical decryption circuit of claim 16, wherein the optical decryption circuit comprises multiple Feistel arms; and wherein each Feistel arm receives a pair of encrypted optical Feistel signals, and wherein an output of a Feistel stage in a first arm is provided to an input of a Feistel stage of a second arm.

22. The optical decryption circuit of claim 21, wherein the pair of encrypted Feistel input signals provided to at least one Feistel arm represent decoy signals matching decoy signals provided to the encrypter.

* * * * *